(12) United States Patent
Daggolu et al.

(10) Patent No.: US 12,480,437 B2
(45) Date of Patent: Nov. 25, 2025

(54) NON-EMITTING ENGINES WITH OXYFUEL COMBUSTION AND CARBON CAPTURE SYSTEM

(71) Applicant: CUMMINS INC., Columbus, IN (US)

(72) Inventors: Prashant Reuben Daggolu, Columbus, IN (US); John Robert Pendray, Blaine, MN (US); Aleksey Yezerets, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/832,454

(22) PCT Filed: Jan. 20, 2023

(86) PCT No.: PCT/US2023/011201
§ 371 (c)(1),
(2) Date: Jul. 24, 2024

(87) PCT Pub. No.: WO2023/154174
PCT Pub. Date: Aug. 17, 2023

(65) Prior Publication Data
US 2025/0101906 A1    Mar. 27, 2025

Related U.S. Application Data

(60) Provisional application No. 63/308,410, filed on Feb. 9, 2022.

(51) Int. Cl.
*F02B 47/10*    (2006.01)
*F01N 3/08*    (2006.01)
*F01N 3/10*    (2006.01)

(52) U.S. Cl.
CPC ............ *F02B 47/10* (2013.01); *F01N 3/0857* (2013.01); *F01N 3/103* (2013.01); *F01N 2260/022* (2013.01)

(58) Field of Classification Search
CPC .......... F02B 47/10; F01N 3/00; F01N 3/0857; F01N 3/103; F01N 2260/022; F01K 23/06; F01K 23/065; F01K 23/10
See application file for complete search history.

(56) References Cited

U.S. PATENT DOCUMENTS 3,844,262 A    10/1974 Dieges
3,862,624 A    1/1975 Underwood
(Continued)

FOREIGN PATENT DOCUMENTS

CN           103277219 A    9/2013
DE   10 2012 219 755 A1    4/2014
(Continued)

OTHER PUBLICATIONS

International Search Report and Written Opinion on PCT/US2023/011201, dated Jun. 13, 2023.
(Continued)

*Primary Examiner* — Loren C Edwards
(74) *Attorney, Agent, or Firm* — Foley & Lardner LLP

(57) ABSTRACT

An engine system includes an oxygen capture system including at least one adsorbent material, an internal combustion engine fluidly coupled to the oxygen capture system, an exhaust processing system fluidly coupled to the internal combustion engine, the exhaust processing system including a catalytic system, at least one cooler and at least one gas/liquid separator, and a carbon capture system fluidly coupled to the exhaust processing system and the internal combustion engine, the carbon capture system including a carbon dioxide condenser and a carbon dioxide storage.

16 Claims, 6 Drawing Sheets

(56) References Cited

U.S. PATENT DOCUMENTS

| | | | |
|---|---|---|---|
| 4,112,875 | A | 9/1978 | Lauman et al. |
| 6,263,659 | B1 * | 7/2001 | Dillon, IV .......... F25J 3/04036 |
| | | | 60/39.12 |
| 7,043,920 | B2 | 5/2006 | Viteri et al. |
| 8,480,798 | B1 | 7/2013 | Myers et al. |
| 9,574,476 | B2 | 2/2017 | Hyde et al. |
| 9,598,993 | B2 | 3/2017 | Younes et al. |
| 2003/0092562 | A1 | 5/2003 | Nakanishi et al. |
| 2007/0266995 | A1 | 11/2007 | Ha et al. |
| 2009/0139497 | A1 * | 6/2009 | Shi .................... F02B 47/08 |
| | | | 96/95 |
| 2014/0060013 | A1 * | 3/2014 | Dunn ................... F01K 23/068 |
| | | | 60/278 |
| 2017/0292077 | A1 | 10/2017 | Young et al. |
| 2020/0191386 | A1 | 6/2020 | Harper |
| 2020/0271050 | A1 | 8/2020 | Dunn |

FOREIGN PATENT DOCUMENTS

| | | |
|---|---|---|
| GB | 2 573 124 A | 10/2019 |
| WO | WO-2014/036256 A1 | 3/2014 |
| WO | WO-2014141501 A1 * | 9/2014 ......... B01D 53/0462 |
| WO | WO-2018/146624 A1 | 8/2018 |

OTHER PUBLICATIONS

Netpower, "The Allam-Fetvedt Cycle," downloaded from https://Netpower.com/technology, May 19, 2021, pp. 1-15.

* cited by examiner

NON-EMITTING ENGINES WITH OXYFUEL COMBUSTION AND CARBON CAPTURE SYSTEM

CROSS-REFERENCE TO RELATED PATENT APPLICATIONS

The present application is the U.S. national phase of PCT Application No. PCT/US2023/011201, filed Jan. 20, 2023, which claims priority to and the benefit of U.S. Provisional Patent Application No. 63/308,410, filed Feb. 9, 2022, the contents of which are incorporated herein by reference.

TECHNICAL FIELD

The present disclosure relates generally to emissions reduction systems in engine systems.

BACKGROUND

Internal combustion engines may be replaced with electric systems, such as in a battery electric vehicle. Battery electric vehicles, however, use grid electricity that can have high carbon intensity. Additionally, decarbonization of the grid is expensive and is a long-term endeavor. Engines can also be redesigned to use $H_2$ as a fuel, such as hydrogen received from a steam methane reforming process. The steam methane reforming process requires production, transportation, and storage processes that may produce carbon emissions.

SUMMARY

In one embodiment, an engine system includes an oxygen capture system including at least one adsorbent material, an internal combustion engine fluidly coupled to the oxygen capture system, an exhaust processing system fluidly coupled to the internal combustion engine, the exhaust processing system including a catalytic system, at least one cooler and at least one gas/liquid separator, and a carbon capture system fluidly coupled to the exhaust processing system and the internal combustion engine. The carbon capture system includes a carbon dioxide condenser and a carbon dioxide storage.

In another embodiment, an emissions treatment method for use with a system that includes an oxygen capture system, a first cooler, and an internal combustion engine. The emissions treatment method also includes receiving, by the oxygen capture system, intake air and hot exhaust. The emissions treatment method also includes separating, by the oxygen capture system, oxygen from the intake air. The emissions treatment method also includes cooling, by the first cooler, the oxygen to form cooled oxygen. The emissions treatment method also includes combusting, by the internal combustion engine, the cooled oxygen and the fuel to provide the hot exhaust.

In yet another embodiment, an engine system includes an internal combustion engine, an oxygen absorber, a first cooler, a second cooler, and a gas/liquid separator. The internal combustion engine is configured to provide hot exhaust. The oxygen absorber is configured to receive intake air, receive the hot exhaust from the internal combustion engine, and provide oxygen enriched exhaust. The first cooler is configured to receive the oxygen enriched exhaust from the oxygen absorber and provide cooled oxygen enriched exhaust to the internal combustion engine. The second cooler is configured to receive the hot exhaust from the internal combustion engine and provide cooled exhaust. The gas/liquid separator is configured to receive the cooled exhaust from the second cooler, provide exhaust, and provide water. The internal combustion engine is further configured to receive the exhaust from the gas/liquid separator.

This summary is illustrative only and is not intended to be in any way limiting.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate certain example embodiments in detail, it should be understood that the present disclosure is not limited to the details or methodology set forth in the description or illustrated in the figures. It should also be understood that the terminology used herein is for the purpose of description only and should not be regarded as limiting.

Implementations herein relate to a system for oxygen generation and carbon collection within an engine system for use in decreasing carbon emissions. In some embodiments, the system includes an oxygen production system that separates oxygen ($O_2$) from ambient air. The oxygen production system may include a pressure swing adsorption system (PSA) and/or a temperature swing adsorption (TSA) system to capture the oxygen. The captured oxygen may be used during combustion in an oxy-fuel internal combustion engine (e.g., internal combustion engine using the oxy-fuel combustion process) exhausting $H_2O$ (water) and $CO_2$ (carbon dioxide). In some embodiments, the system includes a carbon capture system that captures and stores the carbon dioxide. In some embodiments, the carbon capture system condenses the carbon dioxide. In some embodiments, the system includes a catalytic system to oxidize unburned hydrocarbons into water and carbon dioxide.

Figure 1:
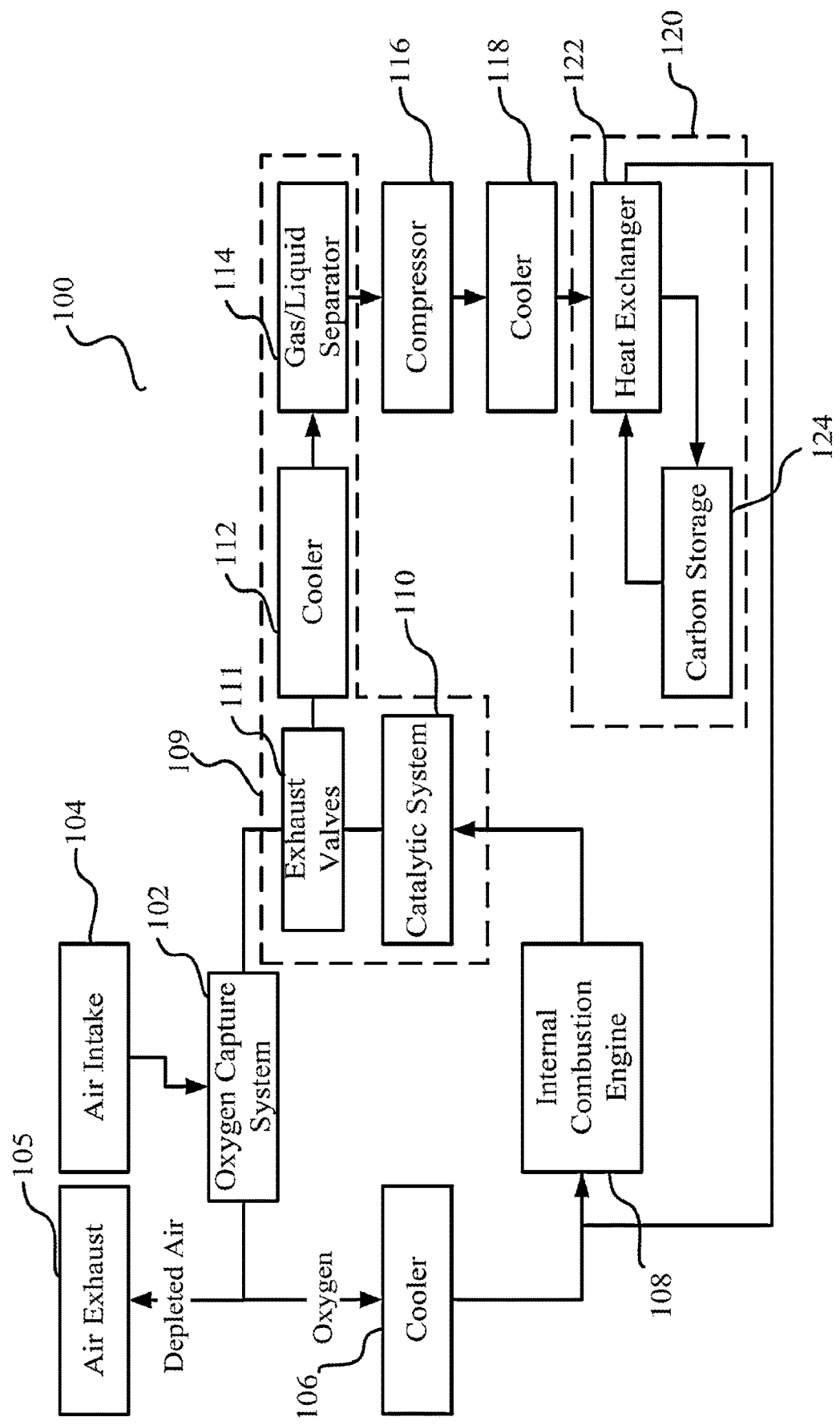
FIG. 1 is a diagram of an engine system, according to an example embodiment.

FIG. 1 is a diagram of an engine system 100, according to an example embodiment. The engine system 100 is used to decrease or eliminate carbon emission from an internal combustion engine by using an oxygen capture system and a carbon capture system with an oxy-fuel engine. Employing these systems allows for fossil fuels to continue to be used while minimizing or eliminating carbon footprint because the carbon dioxide produced by combustion is captured. The engine system 100 may be on a passenger vehicle (e.g., sedan, van, pick-up truck, etc.), a heavy-duty cargo vehicle (e.g., semi-trailer truck, etc.), a watercraft (e.g., boat, ship, sailing vessel, cargo vessel, etc.), heavy equipment (e.g., excavator, bulldozer, compactor, etc.), stationary system (e.g., generator, etc.), or on another system that employs an engine. In some embodiments, the engine system 100 is used in a closed setting (e.g., indoors, inside a mine, etc.) where emissions may create unsafe (e.g., polluted) air quality. The engine system 100 may include any other components required for the engine system 100 to function properly (e.g., carburetor, drivetrain, controller, etc.).

The engine system 100 includes an oxygen capture system 102 and an air intake 104. The air intake 104 is fluidly coupled (e.g., connected via pipe) to the oxygen capture system 102. The oxygen capture system 102 receives air (e.g., intake air, ambient air from outside the engine system 100) from the air intake 104. The air intake 104 may be an intake manifold, a pump, or a similar device. The air intake 104 may be fluidly coupled to a storage system (e.g., a storage tank, gas cylinder, etc.), from which the air intake 104 pulls in intake air. In some embodiments, the air intake 104 may include a filter or a filtration system to filter out particles, pollutants, and/or unneeded gases (e.g., gases not used for combustion). In some embodiments, the air intake 104 is configured to change (e.g., increase or decrease) the pressure of the intake air.

The oxygen capture system 102 is configured to separate oxygen from the intake air. In some embodiments, the oxygen capture system 102 utilizes a pressure swing adsorption (PSA) system to separate the oxygen from the intake air. The PSA system utilizes an adsorbent material (e.g., zeolite, activated carbon, etc.) and pressurizes the intake air to separate the oxygen from the intake air. In some embodiments, the adsorbent material may be a membrane. The pressure to which the intake air is pressurized and the type of adsorbent material are chosen such that the oxygen is most effectively absorbed. The pressure is then decreased to desorb the adsorbed oxygen.

In some embodiments, the oxygen capture system 102 utilizes a temperature swing adsorption (TSA) system to separate the oxygen from the intake air. The TSA system utilizes an adsorbent material and changes the temperature of the intake air to separate the oxygen from the intake air. In some embodiments, the adsorbent material may be a membrane. The temperature to which the intake air is changed and the type of adsorbent material are chosen such that the oxygen gas is most effectively adsorbed. The temperature is then changed again to desorb the adsorbed gas.

In some embodiments, the oxygen capture system 102 utilizes a vacuum swing adsorption (VSA) system to separate the oxygen from the intake air. A VSA system is similar to a PSA system, except the pressure is changed between vacuum pressure and atmospheric pressures. The exact pressures and the adsorbent material may be chosen such that the oxygen gas is most effectively adsorbed. In some embodiments, the oxygen capture system 102 may utilize any combination of VSA system, PSA system, and TSA system. When utilizing a combination of VSA system, PSA system, and TSA system, one system may adsorb oxygen, while another system regenerates and desorbs oxygen, allowing for a constant production of oxygen.

In some embodiments where the oxygen capture system 102 utilizes a VSA system and a PSA system, each of the VSA system and the PSA system includes at least two absorbent beds, where at least one adsorbent bed adsorbs oxygen, while at least one other adsorbent bed desorbs gases and regenerates, allowing for a constant production of oxygen. The desorbed gas may be pure oxygen or may comprise a gaseous mixture of mostly oxygen (e.g., a gaseous mixture with oxygen at a higher concentration than in atmosphere). The oxygen capture system 102 may include a storage system that stores the desorbed gases. Such a storage system may be used so that there is always an excess of available oxygen available, ensuring the engine system 100 can have a consistent output. In some embodiments, the oxygen capture system 102 may include an oxygen storage system that may be pre-filled with oxygen or may store captured oxygen. In some embodiments, the oxygen capture system 102 may include chemical systems or cryogenic systems to separate oxygen from intake air.

The engine system 100 also includes an air exhaust 105. The air exhaust 105 is fluidly coupled to and positioned downstream of the oxygen capture system 102. The air exhaust 105 receives the oxygen depleted air from the oxygen capture system 102 and exhausts the oxygen depleted air. In some embodiments, the air exhaust 105 may include a conduit that routes the exhaust to an exhaust chamber or to a storage device. In some embodiments, the air exhaust 105 may include a filter configured to filter out particulates or certain gases from the oxygen depleted air.

The engine system 100 also includes a first cooler 106. The first cooler 106 is fluidly coupled to and positioned downstream of the oxygen capture system 102. The first cooler 106 receives the desorbed gases from the oxygen capture system 102 and cools the desorbed gases to a temperature suitable for desirable combustion. In some embodiments, the suitable temperature may change depending on the environmental conditions (e.g., ambient temperature, engine load, engine size, etc.). The first cooler 106 may be an active cooler (e.g., fan, heat pump, evaporative cooler, refrigeration system, etc.) or a passive cooler (e.g., heat pipe, etc.), or a combination of an active cooler and a passive cooler. The first cooler 106 may include multiple stages to bring the temperature of the desorbed gases down to the suitable temperature.

As shown in FIG. 1, the engine system 100 also includes an internal combustion engine 108. The internal combustion engine 108 is fluidly coupled to and downstream of the first cooler 106. The internal combustion engine 108 may be an oxy-fuel combustion engine. An oxy-fuel engine burns fuel using pure oxygen as an oxidizer or using a gaseous mixture of mostly oxygen (e.g., a gaseous mixture with oxygen at a higher concentration than in atmosphere) as an oxidizer, or by using a mixture of oxygen and recirculated gas (e.g., gas that has already passed through the system). Utilizing an oxy-fuel engine reduces fuel consumption because the nitrogen component of air does not get heated and is instead separated out by the oxygen capture system 102. The internal combustion engine 108 receives the desorbed gases that have been cooled by the first cooler 106 and receives fuel from an external source. In some embodiments, the internal combustion engine 108 may additionally receive recirculated gas. The internal combustion engine 108 then combusts its contents and exhausts the gases remaining after combustion. The exhaust may include unburned fuel, unused oxygen, and additional gases that were not used up during combustion in addition to the gases produced by combustion. The exhaust may be provided from the internal combustion engine 108 to an aftertreatment system that treats the exhaust by removing particulates from the exhaust and/or converting components (e.g., NOx, $SO_x$, etc.) in the exhaust into more desirable components (e.g., nitrogen, etc.).

The engine system 100 includes an exhaust processing system 109. As is explained in more detail herein, the exhaust processing system 109 is configured to process exhaust produced by the internal combustion engine 108 and therefore increase desirability of the engine system 100. For example, the exhaust processing system 109 may enable compliance of the engine system 100 with emissions regulations.

The exhaust processing system 109 includes a catalytic system 110. The catalytic system 110 is fluidly coupled to and positioned downstream of the internal combustion engine 108 and the oxygen capture system 102. The catalytic system 110 receives the gases (e.g., exhaust, etc.) exhausted by the internal combustion engine 108 and bonds the unburned hydrocarbons (e.g., of the fuel) with unused oxygen. The catalytic system 110 may include an oxidation catalyst to bond the unburned hydrocarbons with the unused oxygen. The resulting processed exhaust is mostly water and carbon dioxide. A portion of the processed exhaust may be returned to the oxygen capture system 102.

The exhaust processing system 109 also includes at least one exhaust valve 111. The exhaust valves 111 are fluidly coupled to and positioned downstream of the catalytic system 110. The exhaust processing system 109 also includes at least one second cooler 112. The exhaust valves 111 include a plurality of valves configured to control how much processed exhaust is returned to the oxygen capture system 102 and how much processed exhaust proceeds to the second cooler 112. The operation of the exhaust valves 111 may be controlled by a control system. The control system of the exhaust valves 111 may include at least one sensor located within the fluid conduits or components of the engine system 100 that monitor the contents of the engine system 100 and determine how much processed exhaust should be delivered to the oxygen capture system 102 and the second cooler 112.

The second cooler 112 is fluidly coupled to and positioned downstream of the catalytic system 110 and the exhaust valves 111. The second cooler 112 receives the processed exhaust from the catalytic system 110 through the exhaust valves 111 and cools the processed exhaust to condense gaseous carbon dioxide, thereby forming liquid carbon dioxide (alone or in combination with gaseous carbon dioxide). In some embodiments, the specific temperature to which the second cooler 112 cools the processed exhaust may vary depending on the environmental conditions (e.g., ambient pressure, pressure of the exhaust, etc.). The second cooler 112 may be an active cooler, a passive cooler, or a combination of an active cooler and a passive cooler. The second cooler 112 may include multiple stages to bring the temperature of the processed exhaust down such that the carbon dioxide condenses.

The exhaust processing system 109 also includes a gas/liquid separator 114. The gas/liquid separator 114 is fluidly coupled and positioned downstream of the second cooler 112. The gas/liquid separator 114 is a device configured to separate liquid from a gas (e.g., flash drum, demister, etc.) in a mixture, such as the cooled processed exhaust from the second cooler 112. The gas/liquid separator 114 separates the gases from the water and the liquid carbon dioxide condensed by the second cooler 112. The water and the liquid carbon dioxide may then be discarded out of the engine system 100 through an outlet (e.g., drain hose, etc.). In some embodiments, the water and liquid carbon dioxide are discarded through vaporization. In some embodiments, the water and liquid carbon dioxide may be collected in a storage system. The stored water and liquid carbon dioxide may be used by other engine processes or may be collected and disposed of once the storage system is full. In some embodiments, the water and liquid carbon dioxide may be used in a cooling system (e.g., evaporative cooler, heat exchanger, etc.). The separated gases (e.g., gaseous carbon dioxide, water vapor, etc.) exit the gas/liquid separator 114 through a gas outlet. The gas outlet is configured to only allow gases to exit. In some embodiments, the gas outlet may include a filter that filters out particulates or pollutants from the separated gases. In some embodiments, the gas/liquid separator 114 may include a system configured to remove ice crystals, or other particulates, from the processed exhaust, such as a cyclonic separator.

The engine system 100 also includes a compressor 116. The compressor 116 is fluidly coupled to and positioned downstream of the gas outlet of the gas/liquid separator 114. The compressor 116 receives the separated gases (e.g., processed exhaust) from the gas/liquid separator 114 and compresses the separated gases. Compression results in some of the separated gases condensing. The pressure to which the compressor 116 compresses the separated gases is determined to be a pressure at which carbon dioxide condenses at the environmental conditions (e.g., ambient temperature, internal temperature, etc.). In some embodiments, the compressor 116 compresses the separated gases without condensing the separated gases. In some embodiments, the compressor 116 includes a second gas/liquid separator to separate the liquid carbon dioxide from the gases (e.g., oxygen) and sends the liquid carbon dioxide to a carbon storage system. The gases may then be recycled back to the internal combustion engine 108 (e.g., for use in combustion, etc.). In some embodiments, the compressor 116 may include a plurality of compression stages.

In some applications, the internal combustion engine 108 is a lean burn engine, meaning that the internal combustion engine 108 combusts fuel at a lower air-to-fuel ratio than other engines. In these applications, an active separation system (e.g., adsorption membrane, cryogenic separator, etc.) may be included upstream or downstream of the compressor 116. The active separation system may separate carbon dioxide and oxygen.

The engine system 100 also includes a third cooler 118. The third cooler 118 is fluidly coupled and is positioned downstream of the compressor 116. The third cooler 118 receives the compressed gases (e.g., processed exhaust, carbon dioxide, etc.) and/or liquid carbon dioxide from the compressor 116. In some embodiments, the third cooler 118 receives only liquid carbon dioxide form the compressor 116. In other embodiments, the third cooler 118 receives gaseous carbon dioxide and liquid carbon dioxide from the compressor 116. The third cooler 118 is configured to cool the compressed gases down to a temperature that causes the carbon dioxide gas to condense. In some embodiments, the specific temperature to which the third cooler 118 cools the compressed gases varies depending on the environmental conditions. The third cooler 118 may be an active or a passive cooler, or a combination of an active cooler and a passive cooler. The third cooler 118 may include multiple stages to cool the compressed gases. In some embodiments, the engine system 100 may include any number of coolers and compressors disposed throughout the engine system 100 to further condition the gases that pass through the engine system 100.

As shown in FIG. 1, the engine system 100 also includes a carbon capture system 120. The carbon capture system 120 is fluidly coupled to the third cooler 118 and the internal combustion engine 108. The carbon capture system 120 receives liquid carbon dioxide and cooled gases from the third cooler 118. The carbon capture system 120 further condenses the cooled gases and stores the liquid carbon dioxide. The carbon capture system 120 stores the carbon dioxide and conditions (e.g., maintains temperature and/or pressure of) the carbon dioxide such that the carbon dioxide remains in a liquid form. The engine system 100 may include a non-condensing conduit path that omits condensing gaseous carbon dioxide, such that the carbon capture system 120 receives and stores gaseous carbon dioxide. In some embodiments, the gaseous carbon dioxide may be compressed. In some embodiments, the carbon capture system 120 may store a mixture of liquid carbon dioxide and gaseous carbon dioxide.

The carbon capture system 120 includes a heat exchanger 122 (e.g., carbon dioxide condenser, etc.). The heat exchanger 122 is fluidly coupled to the third cooler 118 and to the internal combustion engine 108. The heat exchanger 122 may be a parallel-flow heat exchanger, a counter-flow exchanger, a cross-flow heat exchanger, or a similar type of heat exchanger. In some embodiments, the heat exchanger 122 may be an additional cooler. The heat exchanger 122 receives liquid carbon dioxide and cooled gases (e.g., the processed exhaust) from the third cooler 118. The heat exchanger 122 may produce liquid or partial liquid carbon dioxide and send a portion of the cooled gases to the internal combustion engine 108 to aid in combustion. In some embodiments, the cooled gases sent to the internal combustion engine 108 may include excess oxygen. The heat exchanger 122 may further condense the cooled gases by cooling the gases down until they condense into a liquid. In some embodiments, the heat exchanger 122 changes the temperature of the liquid carbon dioxide to a storage temperature. The storage temperature is determined by the pressure at which the carbon dioxide is stored, the type of storage device, and on other similar factors. In some embodiments, the storage temperature may change depending on environmental conditions.

The carbon capture system 120 further includes a carbon storage system 124 (e.g., carbon dioxide storage, etc.). The carbon storage system 124 is fluidly coupled to the heat exchanger 122, receives the liquid or partial liquid carbon dioxide from the heat exchanger 122, and store the liquid or partial liquid carbon dioxide. The carbon storage system 124 is a storage system configured to store liquid carbon dioxide. The carbon storage system 124 may include a refrigeration system. The refrigeration system may continuously cool the carbon storage system 124 or may cool the carbon storage system 124 when a temperature sensor detects the internal temperature of the carbon storage system 124 is above a predetermined threshold. In some embodiments, the carbon storage system 124 may include a power source to power the refrigeration system when the engine system 100 is not in operation. This allows for the carbon storage system 124 to continuously maintain the carbon dioxide in liquid form. In some embodiments, the refrigeration system of the carbon storage system 124 is turned off when the engine system 100 is turned off. The carbon storage system 124 is configured to withstand the increase in pressure when the liquid carbon dioxide heats up when the refrigeration system is not operating.

In some embodiments, the engine system 100 may be configured to turn on periodically, such as when the carbon storage system 124 is below a threshold temperature or after a certain amount of time, to cool the carbon storage system 124. Additionally or alternatively, the engine system 100 may include a power source (e.g., battery bank, etc.) that is configured to provide power to various components of the engine system 100. The carbon storage system 124 may include a sensor configured to measure the temperature and/or how much the carbon storage system 124 is filled.

In some embodiments, the carbon storage system 124 includes an outlet that may be selectively opened and closed. The outlet may be used to empty the contents of the carbon storage system 124. For example, when the carbon storage system 124 is full, the carbon storage system 124 may be fluidly coupled to an external storage tank to empty the fluid contents of the carbon storage system 124. In another example, an engine system 100 is on a semi-trailer truck. When the carbon storage system 124 is full or nearly full, the operator may driver the semi-trailer truck to a carbon waste facility (e.g., gas station, dedicated facility, truck stop, etc.) to safely dispose of the carbon dioxide gas. In some embodiments, the heat exchanger 122 operates as the refrigeration system of the carbon storage system 124.

Gaseous carbon dioxide may be present in the carbon storage system 124. The gaseous carbon dioxide may be from liquid carbon dioxide evaporating in the carbon storage system 124 or from un-condensed carbon dioxide gas from the heat exchanger. The gaseous carbon dioxide in the carbon storage system 124 is returned to the heat exchanger 122. The heat exchanger 122 condenses the gaseous carbon dioxide and returns the liquid carbon dioxide to the carbon storage system 124. This process repeats as long as gaseous carbon dioxide is present in the carbon storage system 124.

In some embodiments, the engine system 100 may include a computer system, comprising at least a processor and a memory. The computer system may monitor and facilitate the emissions treatment method 500. In some embodiments, the computer system include a plurality of sensors disposed throughout the engine system 100. The computer system may be communicably coupled to a plurality of sensors within the engine system 100. The computer system may receive signals and data from the plurality of sensors. The computer system then processes the signals to change the functionality of components of the engine system 100. For example, if a sensor within the carbon storage system 124 indicates that the carbon storage system 124 is full, the computer system may send an alert to an operator indicating the carbon storage system 124 requires emptying.

In various embodiments, the engine system 100 includes the oxygen capture system 102, the internal combustion engine 108, an exhaust processing system, and the carbon capture system 120. In these embodiments, the oxygen capture system 102 includes at least one adsorbent material and the internal combustion engine 108 is fluidly coupled to the oxygen capture system 102. The oxygen capture system 102 passes the air through the at least one adsorbent material and separates out oxygen from the air. The exhaust processing system is fluidly coupled to the internal combustion engine 108 and the exhaust processing system includes the catalytic system 110, at least one cooler 106, and at least one gas/liquid separator 114, in these embodiments. Also in these embodiments, the carbon capture system 120 is fluidly coupled to the exhaust processing system and the internal combustion engine 108, and the carbon capture system 120 includes a carbon dioxide condenser (the heat exchanger 122) and a carbon dioxide storage (the carbon storage system 124).

In some embodiments, the oxygen capture system 102 receives intake air from an air intake 104 and passes the intake air through the at least one adsorbent material, separating out oxygen from the intake air.

In some embodiments, the carbon capture system 120 receives processed exhaust from the exhaust processing system, passes the processed exhaust through the carbon dioxide condenser producing liquid or partial liquid carbon dioxide, and stores the liquid or partial liquid carbon dioxide in the carbon dioxide storage.

In some embodiments, the catalytic system 110 receives exhaust from the internal combustion engine 108 and passes the exhaust through an oxidation catalyst to bond unburned hydrocarbons with unused oxygen.

In some embodiments, the exhaust processing system receives exhaust from the internal combustion engine 108, passes the exhaust from the at least one cooler 106 to produce water, and passes the exhaust and the water through the at least one gas/liquid separator 114 to separate exhaust from the water.

In some embodiments, the carbon capture system 120 receives processed exhaust from the exhaust processing system, passes the processed exhaust through a compressor 116 producing compressed gaseous carbon dioxide, and stores the compressed gaseous carbon dioxide in the carbon dioxide storage.

Figure 2:
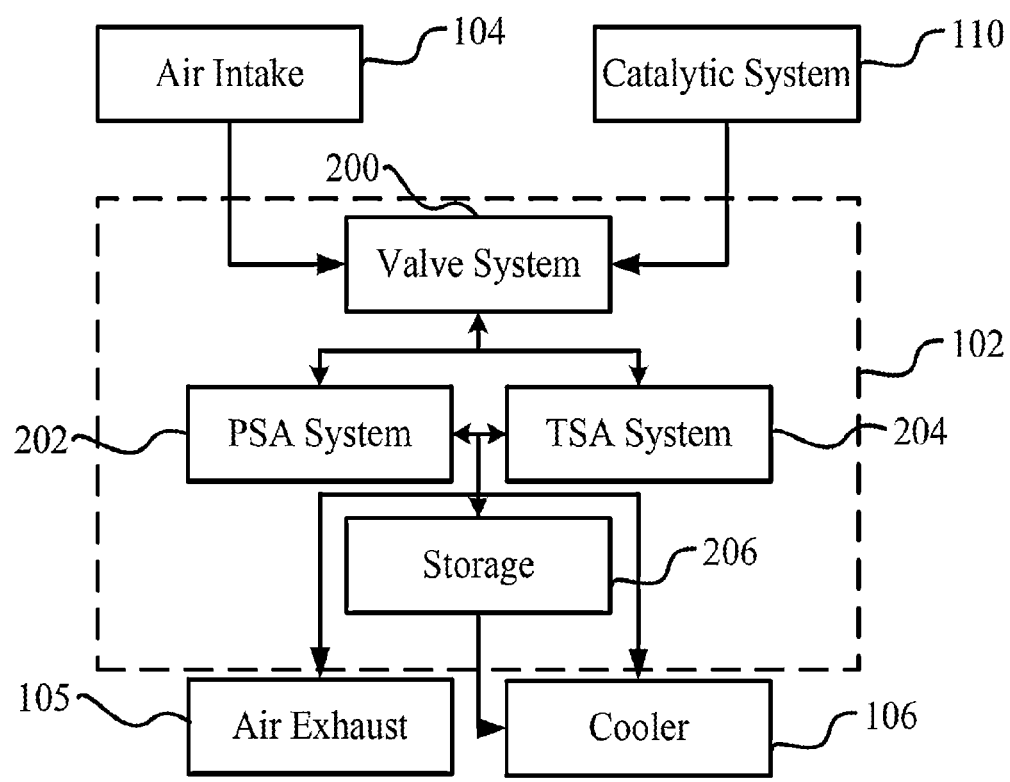
FIG. 2 is a diagram of an oxygen capture system, according to an example embodiment.

FIG. 2 is a diagram of an oxygen capture system, such as the oxygen capture system 102, according to an example embodiment. As in FIG. 1, the oxygen capture system 102 is fluidly coupled to the air intake 104 and the catalytic system 110. The oxygen capture system 102 receives intake air from the air intake 104. In some embodiments, the intake air may be filtered ambient air. The oxygen capture system 102 receives processed exhaust from the catalytic system 110. The intake air and the processed exhaust enter the oxygen capture system 102 at a valve system 200. The valve system 200 includes a plurality of valves fluidly coupled to the components of the oxygen capture system 102. The valve system 200 facilitates the distribution of the intake air and the processed exhaust to a PSA system 202 and a TSA system 204, both of which are fluidly coupled to the valve system. In some embodiments, the valve system 200 may include a pressurizer to alter the pressure of the gases within the valve system 200 to provide correct pressure gases to the oxygen capturing processes. In some embodiments, the valve system 200 may include a temperature-altering device to alter the temperature of the gases within the valve system 200 to provide correct temperature gases to the oxygen capturing processes.

The PSA system 202 is a pressure swing adsorption system, as discussed previously. The PSA system 202 may include two adsorbent canisters (e.g., storage systems with an adsorbent) that allow for continuous production of oxygen. As the PSA system 202 swings between a lower pressure and a higher pressure, the two adsorbent canisters are in opposite states (e.g., one canister is at a higher pressure and the other canister is at a lower pressure). Including two adsorbent canisters in opposite states allows one canister to adsorb oxygen while the other canister desorbs oxygen. In some embodiments, the PSA system 202 includes a rotating adsorbent bed. The rotating adsorbent bed constantly rotates through a higher pressure area and a lower pressure area, thereby adsorbing oxygen in the higher pressure area and desorbing oxygen in the lower pressure area. In some embodiments, the PSA system 202 may include any even number (e.g., 2, 4, 6, 8, 10, etc.) of absorbent canisters. For example, a PSA system 202 may include four adsorbent canisters, two of the adsorbent canisters are at a higher pressure and the other two canisters are at a lower pressure.

The TSA system 204 is a temperature swing adsorption system, as discussed above. The TSA system 204 may include two adsorbent canisters that allow for continuous production of oxygen. As the TSA system 204 swings between a lower temperature and a higher temperature, the two adsorbent canisters are in opposite states (e.g., one canister is at a higher temperature and the other canister is at a lower temperature). Including two adsorbent canisters in opposite states allows one canister to adsorb oxygen while the other canister desorbs oxygen. In some embodiments, the TSA system 204 could include a rotating adsorbent bed. The rotating adsorbent bed constantly rotates through a higher temperature area and a lower temperature area, constantly adsorbing oxygen in the higher temperature area and desorbing oxygen in the lower temperature area. In some embodiments, the TSA system 204 may include any even number of absorbent canisters. For example, a TSA system 204 may include four adsorbent canisters, two of the adsorbent canisters are at a higher temperature and the other two canisters are at a lower temperature.

The PSA system 202 and the TSA system 204 are fluidly coupled such that the gas may pass from one system to the other. In some embodiments, gas may flow between the PSA system 202 and the TSA system 204 through the valve system 200. In some embodiments, the PSA system 202 adsorbs while the TSA system 204 desorbs and regenerates, and vice versa, such that oxygen is constantly being produced. In some embodiments, the oxygen capture system 102 includes only a PSA system 202 or a TSA system 204 that to capture oxygen. The PSA system 202 and the TSA system 204 fluidly couple to the air exhaust 105 to exhaust the oxygen depleted air after adsorption.

The oxygen capture system 102 may include a storage 206. The storage 206 may be a storage system configured to store oxygen. The storage 206 is fluidly coupled to the PSA system 202 and the TSA system 204. The storage 206 stores oxygen to provide to the first cooler 106. In some embodiments, the oxygen capture system 102 may only operate periodically to refill the storage 206 when the amount of oxygen within the oxygen capture system 102 is below a threshold. In some embodiments, the PSA system 202 and the TSA system 204 bypass the storage 206 and delivery oxygen directly to the first cooler 106.

Figure 3:
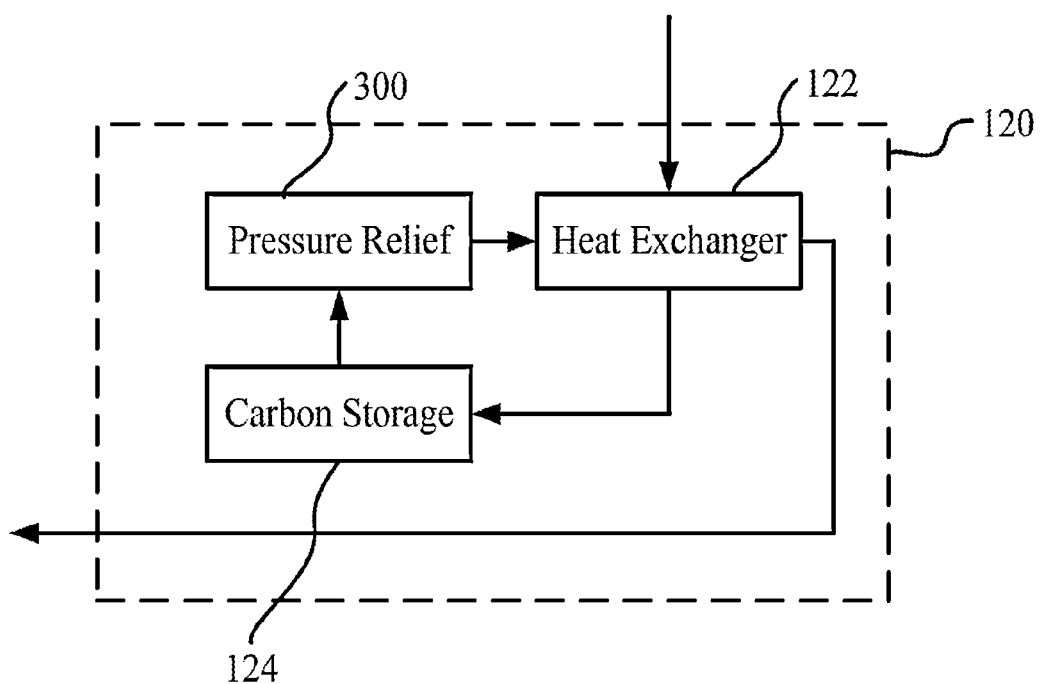
FIG. 3 is a diagram of a carbon capture system, according to an example embodiment.
Figure 4:
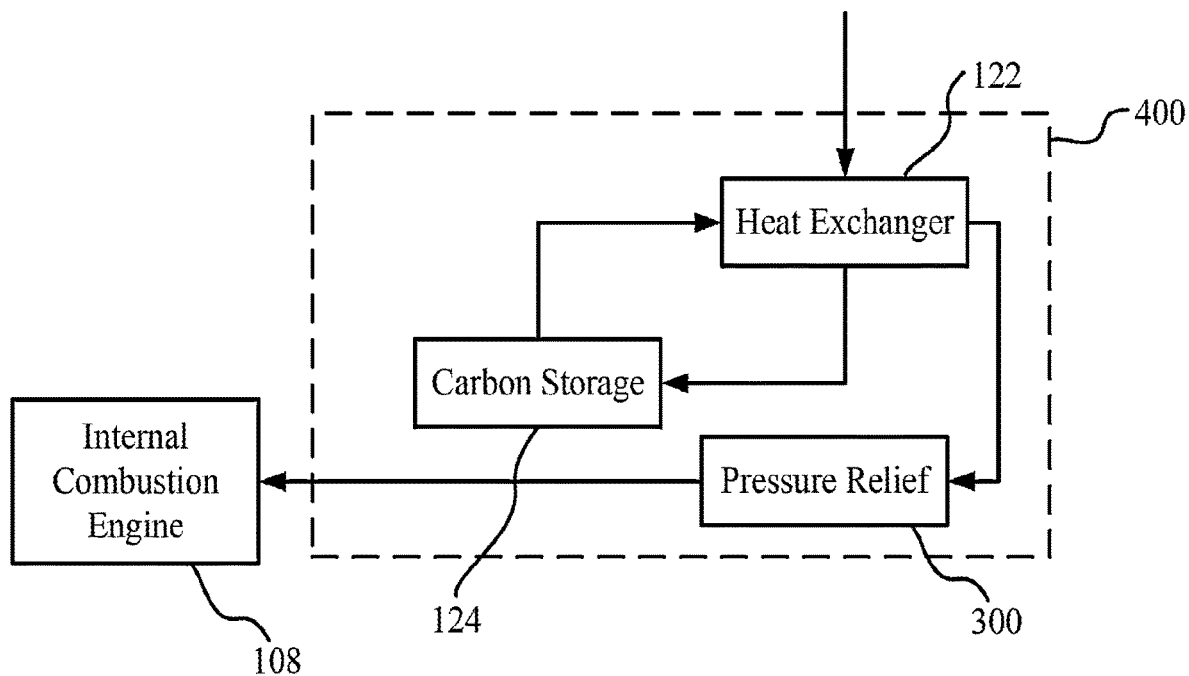
FIG. 4 is a diagram of a carbon capture system, according to another example embodiment.

Referring generally to FIGS. 3-4, carbon capture systems 120 are shown to include a pressure relief device 300. The pressure relief device 300 comprises a valve configured to relieve pressure (e.g., pressure relief valve, ball valve, needle valve, etc.). The pressure relief device 300 may automatically release gas or may be controlled externally to release gas. In some embodiments, the pressure relief device 300 may be fluidly coupled to a separate storage device that receives released gas from the pressure relief device 300.

FIG. 3 is a diagram of a carbon capture system 120, according to an example embodiment. The carbon capture system 120 includes a pressure relief device 300 between the carbon storage system 124 and the heat exchanger 122. The pressure relief device 300 releases gas from the carbon storage system 124 when the pressure in the carbon storage system 124 is above a threshold.

FIG. 4 is a diagram of a second carbon capture system 400 according to another example embodiment. The second carbon capture system 400 includes a pressure relief device 300 located between the heat exchanger 122 and the internal combustion engine 108. The pressure relief device 300 releases gas from the second carbon capture system 400. The pressure relief device 300 releases gas from the second carbon capture system 400 when the pressure in the carbon capture system 120 is above a threshold. In some embodiments, the engine system 100 may include both the embodiment of FIG. 3 and the embodiment of FIG. 4, wherein there is a pressure relief device 300 is included both between the carbon storage system 124 and the heat exchanger 122 and between the heat exchanger 122 and the internal combustion engine 108.

Figure 5:
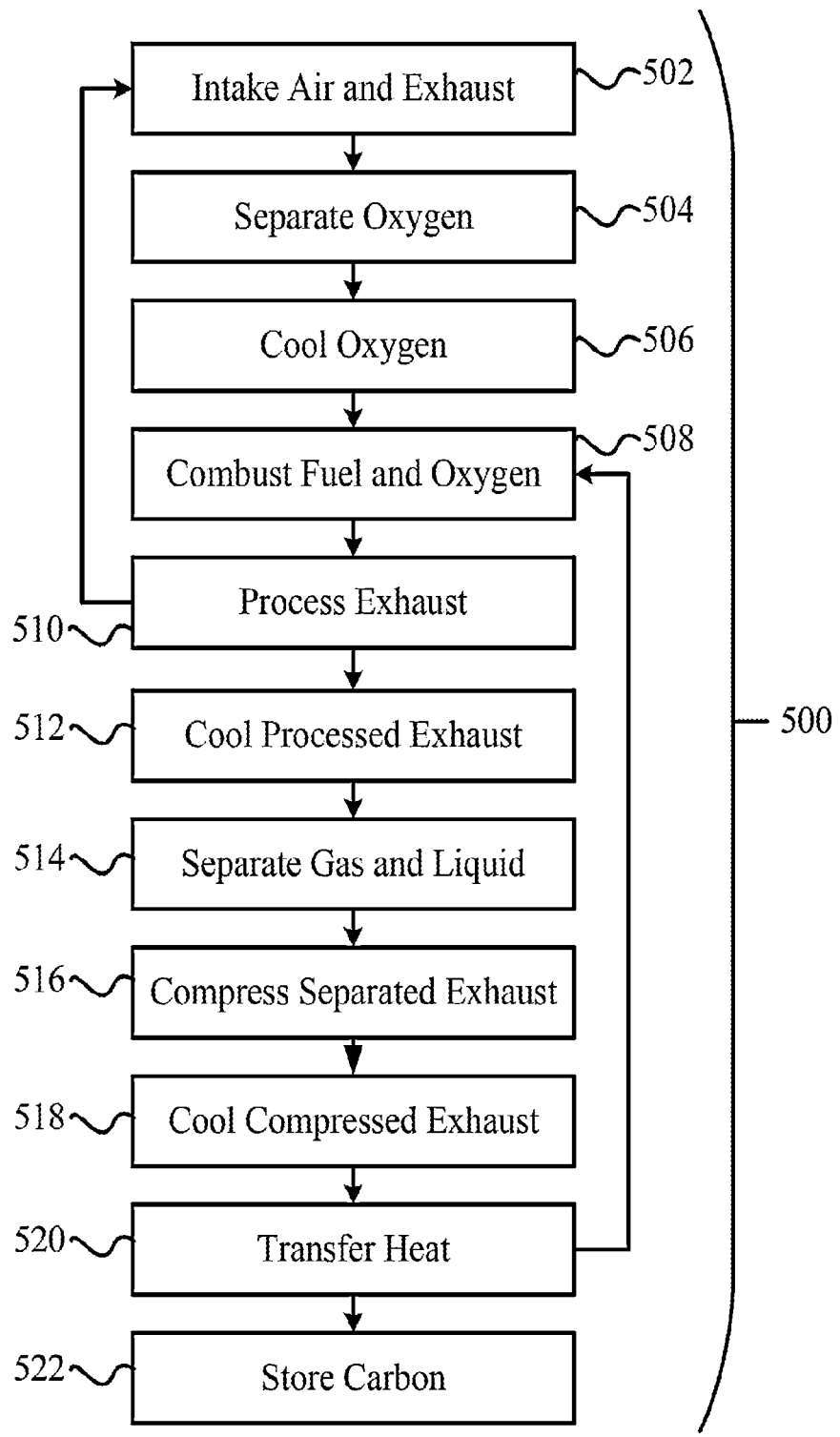
FIG. 5 is a flow chart of an emissions treatment method, according to an example embodiment.

FIG. 5 is a flow chart of an emissions treatment method 500, according to an example embodiment. The emissions treatment method 500 employs an engine system, such as engine system 100 that utilizes an oxygen capture system 102 and a carbon capture system 120 to reduce the carbon emissions produced by the internal combustion engine 108. In some embodiments, the processes of the emissions treatment method 500 may progress automatically. In some embodiments, the steps of the emissions treatment method 500 may be facilitated by a computer system operably coupled to the engine system 100.

At 502, the oxygen capture system 102 intakes air from an air intake 104 and exhaust from the catalytic system 110. The intake air and the exhaust may enter a valve system 200. The valve system 200 may alter the pressure and/or the temperature of the intake air and the exhaust to maximize how much oxygen can be separated during step 504. In some embodiments, the valve system 200 directs a predetermined quantity of gas to different oxygen capturing systems, such as PSA system 202 and TSA system 204, to ensure a sufficient quantity of gases enter the oxygen capturing systems. In some embodiments, the intake air may be directed to the PSA system 202, and the exhaust may be directed to the TSA system or vice versa. In some embodiments, 502 may include receiving oxygen from an oxygen tank or similar oxygen storage.

At 504, the oxygen capture system 102 separates oxygen from the intake air and the exhaust. The oxygen capture system 102 employs a PSA system 202 and a TSA system 204 to separate oxygen. In some embodiments, the oxygen capture system 102 may utilized a VSA system to capture oxygen additionally. In some embodiments, such as when oxygen is received by the oxygen capture system 102 from an oxygen tank, 504 may include sending the oxygen directly to the first cooler 106. The separated oxygen may be stored in the storage 206 or may be directed directly to the first cooler 106.

At 506, the captured oxygen is cooled by the first cooler 106 and sent to the internal combustion engine 108 for combustion. At 508, the internal combustion engine 108 combusts fuel and the cooled oxygen. In some embodiments, the internal combustion engine 108 may take in carbon dioxide gas or other exhaust gases from the heat exchanger 122. These gases are used by the internal combustion engine 108 to facilitate combustion. The internal combustion engine 108 exhausts unburned fuel, unused oxygen, water, carbon dioxide, and a small amount of other gases (e.g., gases that were not filtered out) after combustion. The exhaust is directed to the catalytic system 110.

At 510, the exhaust is processed by the catalytic system 110. The catalytic system 110 bonds the unburned hydrocarbons with the unused oxygen by using a catalyst. Bonding the unburned hydrocarbons with the unused oxygen leaves the processed exhaust comprising carbon dioxide, water, and a small amount of other gases. A portion of the processed exhaust returns to the oxygen capture system 102 such that any oxygen from the process exhaust may be separated. The remaining processed gas is directed to the second cooler 112. At 512, the processed exhaust is cooled by the second cooler 112. The second cooler 112 cools the processed exhaust such that at least some of the gaseous carbon dioxide within the processed exhaust condenses into liquid carbon dioxide. At 514, the water and liquid carbon dioxide in the cooled exhaust is separated by the gas/liquid separator 114 from the gases of the cooled exhaust. The water and liquid carbon dioxide may be stored or disposed of depending on the configuration of the engine system 100. The separated gas is sent to the compressor 116.

At 516, the separated gas is compressed by the compressor 116. In some embodiments, the separated gas is compressed such that the gaseous carbon dioxide condenses into liquid carbon dioxide. In some embodiments, the compressor 116 compresses the separated gas to a certain pressure without condensing the gaseous carbon dioxide. After compression, the compressed gases and/or liquid are sent to the third cooler 118. At 518, the compressed gas is cooled by the third cooler 118. The compressed gas is cooled such a portion or all of the carbon dioxide gas condenses into liquid carbon dioxide. At 520, a heat is transferred by a heat exchanger 122 from the liquid carbon dioxide to bring the carbon dioxide to a suitable temperature for storage. In some embodiments, the heat exchanger 122 may further cool the carbon dioxide gas to condense the carbon dioxide gas into liquid carbon dioxide. At 520, a portion of the carbon dioxide gas may be sent to the internal combustion engine 108 for combustion. At 522, the liquid carbon dioxide is stored in the carbon storage system 124. Storing the liquid carbon dioxide prevents the carbon dioxide from exiting the engine system 100 and entering the atmosphere. The stored liquid carbon dioxide may be emptied from the carbon storage system 124 in a manner that does not pollute the atmosphere and processed into a non-polluting form.

In various embodiments, the emissions treatment method 500 includes providing an oxygen capture system 102, a first cooler 106, and an internal combustion engine 108, receiving, by the oxygen capture system 102, intake air and hot exhaust, separating, by the oxygen capture system 102, oxygen from the intake air, cooling, by the first cooler 106, the oxygen to form cooled oxygen, and combusting, by the internal combustion engine 108, the cooled oxygen and the fuel to provide the hot exhaust.

In some embodiments, the emissions treatment method 500 also includes providing a second cooler 112 and cooling, by the second cooler 112, the hot exhaust to form cooled exhaust.

In some embodiments, the emissions treatment method 500 also includes providing a gas/liquid separator 114 and separating, by the gas/liquid separator 114, the cooled exhaust to form gas and a liquid.

In some embodiments, the emissions treatment method 500 also includes providing, a compressor 116, a third cooler 118, a heat exchanger 122, and a carbon storage, compressing, by the compressor 116, the gas to form a compressed gas, cooling, by the third cooler 118, the compressed gas to form a cooled compressed gas, condensing, by the heat exchanger 122, the cooled compressed gas and a storage gas to form a condensed cooled compressed gas, receiving, by the carbon storage, the condensed cooled compressed gas, and providing, by the carbon storage, the storage gas to the heat exchanger 122.

In some embodiments, the emissions treatment method 500 also includes providing, by the heat exchanger 122, a portion of the condensed cooled compressed gas to the internal combustion engine 108.

In some embodiments, the emissions treatment method 500 also includes cooling, by the carbon storage, the condensed cooled compressed gas to form liquid carbon dioxide, and storing, by the carbon storage, the liquid carbon dioxide.

In some embodiments, the emissions treatment method 500 also includes providing a catalytic system 110, and receiving, by the catalytic system 110, the hot exhaust, where the oxygen capture system 102 receives the hot exhaust downstream of the catalytic system 110, and where the second cooler 112 receives the hot exhaust downstream of the catalytic system 110.

In some embodiments, the emissions treatment method 500 also includes providing, by the oxygen capture system 102, depleted air to atmosphere.

Figure 6:
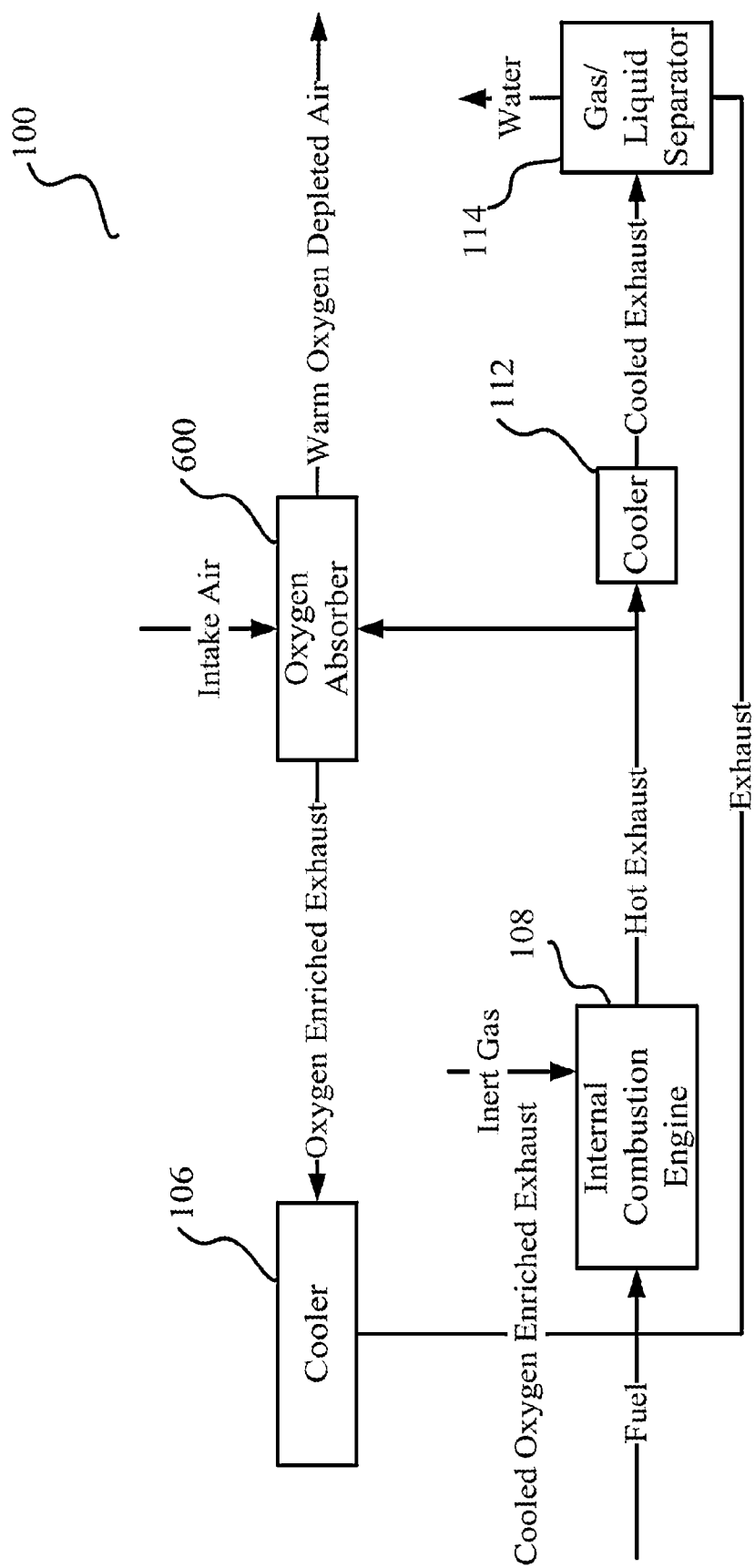
FIG. 6 is a diagram of a portion of an engine system, according to an example embodiment.

FIG. 6 illustrates a portion of the engine system 100, according to various embodiments. In various embodiments, the fuel for the engine system 100 is hydrogen (e.g., the engine system 100 is configured to combust hydrogen, etc.). The engine system 100 includes an oxygen absorber 600. The oxygen absorber 600 receives intake air (e.g., fresh air, etc.) and hot exhaust from the internal combustion engine 108, as is described in more detail herein. The oxygen absorber 600 generates oxygen from the intake air and produces oxygen enriched exhaust and warm oxygen depleted air. The oxygen absorber 600 separates the oxygen from the intake air and provides this oxygen into the hot exhaust.

In some embodiments, the oxygen absorber 600 is a PSA system. The PSA system may utilize an adsorbent material and pressurize the intake air to separate the oxygen from the intake air. In other embodiments, the oxygen absorber 600 is a TSA system. The TSA system may utilize an adsorbent material and change the temperature of the intake air to separate the oxygen from the intake air.

The oxygen enriched exhaust is provided from the oxygen absorber 600 to the first cooler 106. The first cooler 106 cools the oxygen enriched exhaust before the oxygen enriched exhaust is provided to the internal combustion engine 108. In this way, the first cooler 106 may cause the internal combustion engine 108 to operate in a more desirable manner. For example, the cooling provided by the first cooler 106 may increase an efficiency and/or power of the internal combustion engine 108.

In addition to receiving the oxygen enriched exhaust from the first cooler 106, the internal combustion engine 108 also receives fuel and exhaust from the gas/liquid separator 114, as is described in more detail herein. In some embodiments, the internal combustion engine 108 additionally receives an inert gas. The internal combustion engine 108 combusts a combination of the oxygen enriched exhaust, the fuel, the exhaust, and the inert gas (if utilized) to provide power. The inert gas is any inert gas except nitrogen.

The internal combustion engine 108 produces hot exhaust. The hot exhaust is provided to the oxygen absorber 600 and the second cooler 112. As discussed above, the oxygen absorber 600 utilizes the hot exhaust and the intake air to provide oxygen enriched exhaust to the first cooler 106. The oxygen absorber 600 also expels (e.g., to atmosphere, etc.) warm oxygen depleted air.

The second cooler 112 cools the hot exhaust and provides the cooled hot exhaust to the gas/liquid separator 114. The gas/liquid separator 114 separates water from the exhaust, expels the water (e.g., to atmosphere, etc.) and provides the exhaust to the internal combustion engine 108. In various embodiments, the gas/liquid separator 114 does not store anything because the internal combustion engine 108 combusts hydrogen and the water and exhaust are provided from the gas/liquid separator 114.

In these ways, the only emissions from the engine system 100 are water and warm oxygen depleted air. Thus, the engine system 100 is significantly more desirable than other system which emit, for example, harmful exhaust byproducts. As a result, the engine system 100 may also comply with emissions regulations with which other systems may not comply, thereby making the engine system 100 more desirable than these other systems.

In various embodiments, the internal combustion engine 108 is a hydrogen internal combustion engine and the fuel is hydrogen. In other words, the internal combustion engine 108 is configured to combust hydrogen (e.g., in combination with the cooled oxygen enriched exhaust, in combination with the cooled oxygen enriched exhaust and the inert gas).

In various embodiments, the engine system 100 includes the internal combustion engine 108, the oxygen absorber 600, the first cooler 106, the second cooler 112, and the gas/liquid separator 114. In these embodiments, the internal combustion engine 108 is configured to provide hot exhaust and the oxygen absorber 600 is configured to receive intake air, receive the hot exhaust, and provide oxygen enriched exhaust. The first cooler 106 is configured to receive the oxygen enriched exhaust and provide cooled oxygen enriched exhaust to the internal combustion engine 108 and the second cooler 112 is configured to receive the hot exhaust and provide cooled exhaust, in these embodiments. In these embodiments, the gas/liquid separator 114 is configured to receive the cooled exhaust, provide exhaust, and provide water and the internal combustion engine 108 is further configured to receive the exhaust from the gas/liquid separator 114.

In some embodiments, the internal combustion engine 108 is further configured to combust hydrogen.

In some embodiments, the internal combustion engine 108 is further configured to receive an inert gas.

In some embodiments, the inert gas is not nitrogen.

In some embodiments, the water is expelled to atmosphere.

In some embodiments, the oxygen absorber 600 is further configured to provide warm oxygen depleted air and the warm oxygen depleted air is expelled to atmosphere.

It should be noted that the term "example" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled direction to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other example embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layer and modules described in the present disclosure. The memory may be or include volatile memory or non-volatile memory, and may include database components, object code components, script components, or any other type of information structure for supporting the various activities and information structures described in the present disclosure. According to an example embodiment, the memory is communicably connected to the processor via a processing circuit and includes computer code for executing (e.g., by the processing circuit or the processor) the one or more processes described herein.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of system as shown in the various example embodiments is illustrative only. Additionally, any element disclosed in one embodiment may be incorporated or utilized with any other embodiment disclosed herein. For example, the system of the example embodiment described in reference to FIGS. 3 and 4 may be incorporated in the system of the example embodiment described in reference to FIG. 1. Although only one example of an element from one embodiment that can be incorporated or utilized in another embodiment has been described above, it should be appreciated that other elements of the various embodiments may be incorporated or utilized with any of the other embodiments disclosed herein.

What is claimed is:
1. An engine system comprising:
an oxygen capture system comprising at least one adsorbent material;
an internal combustion engine fluidly coupled to the oxygen capture system;
an exhaust processing system fluidly coupled to the internal combustion engine, the exhaust processing system comprising a catalytic system, at least one cooler, and at least one gas/liquid separator;
a carbon capture system fluidly coupled to the exhaust processing system and the internal combustion engine, the carbon capture system comprising a carbon dioxide condenser and a carbon dioxide storage;
a compressor fluidly coupled to the at least one gas/liquid separator and receiving processed exhaust from the at least one gas/liquid separator; and
a second cooler fluidly coupled to the compressor and receiving the processed exhaust from the compressor;
wherein the carbon dioxide condenser is fluidly coupled to the second cooler and receives the processed exhaust from the second cooler;
wherein the carbon dioxide condenser produces liquid or partial liquid carbon dioxide from the processed exhaust; and
wherein the carbon dioxide storage is fluidly coupled to the carbon dioxide condenser and receives the liquid or partial liquid carbon dioxide from the carbon dioxide storage and stores the liquid or partial liquid carbon dioxide.

2. The engine system of claim 1, further comprising an air intake;
wherein the oxygen capture system is fluidly coupled to the air intake and receives intake air from the air intake and passes the intake air through the at least one adsorbent material, separating out oxygen from the intake air.

3. The engine system of claim 1, wherein:
the catalytic system is fluidly coupled to the internal combustion engine and receives exhaust from the internal combustion engine; and
the catalytic system comprises an oxidation catalyst that bonds unburned hydrocarbons in the exhaust with unused oxygen.

4. The engine system of claim 1, wherein:
the catalytic system is fluidly coupled to the internal combustion engine and receives exhaust from the internal combustion engine;
the exhaust processing system includes at least one exhaust valve, the at least one exhaust valve fluidly coupled to the catalytic system and receiving the exhaust from the catalytic system;
the at least one cooler is fluidly coupled to the at least one exhaust valve, the at least one cooler receiving the exhaust from the at least one exhaust valve, and produces water; and
the at least one gas/liquid separator is fluidly coupled to the at least one cooler, the at least one gas/liquid separator receiving the exhaust and the water from the at least one cooler, and separating the exhaust from the water.

5. The engine system of claim 1, wherein the carbon capture system receives the processed exhaust from the exhaust processing system, passes the processed exhaust through the compressor producing compressed gaseous carbon dioxide, and stores the compressed gaseous carbon dioxide in the carbon dioxide storage.

6. An emissions treatment method comprising:
receiving, by an oxygen capture system, intake air and hot exhaust;
separating, by the oxygen capture system, oxygen from the intake air;
receiving, by a first cooler, the oxygen from the oxygen capture system;
cooling, by the first cooler, the oxygen to form cooled oxygen;
receiving, by an internal combustion engine, the cooled oxygen from the first cooler;
receiving, by the internal combustion engine, fuel;
combusting, by the internal combustion engine, the cooled oxygen and the fuel to produce the hot exhaust;
cooling, by a second cooler, the hot exhaust to form cooled exhaust;
separating, by a gas/liquid separator, the cooled exhaust to form gas and a liquid;
compressing, by a compressor, the gas to form a compressed gas;
cooling, by a third cooler, the compressed gas to form a cooled compressed gas;
condensing, by a heat exchanger, the cooled compressed gas and a storage gas to form a condensed cooled compressed gas;
receiving, by a carbon storage, the condensed cooled compressed gas; and
providing, by the carbon storage, the storage gas to the heat exchanger.

7. The emissions treatment method of claim 6, further comprising providing, by the heat exchanger, a portion of the condensed cooled compressed gas to the internal combustion engine.

8. The emissions treatment method of claim 6, further comprising:
cooling, by the carbon storage, the condensed cooled compressed gas to form liquid carbon dioxide; and
storing, by the carbon storage, the liquid carbon dioxide.

9. The emissions treatment method of claim 6, further comprising receiving, by a catalytic system, the hot exhaust;
wherein the oxygen capture system receives the hot exhaust downstream of the catalytic system; and
wherein the second cooler receives the hot exhaust downstream of the catalytic system.

10. The emissions treatment method of claim 6, further comprising discharging, by the oxygen capture system, depleted air to atmosphere.

11. An engine system comprising:
an internal combustion engine configured to provide hot exhaust;
an oxygen absorber configured to receive intake air, receive the hot exhaust from the internal combustion engine, and provide oxygen enriched exhaust;
a first cooler configured to receive the oxygen enriched exhaust from the oxygen absorber and provide cooled oxygen enriched exhaust to the internal combustion engine;
a second cooler configured to receive the hot exhaust from the internal combustion engine and provide cooled exhaust; and
a gas/liquid separator configured to receive the cooled exhaust from the second cooler, provide exhaust, and provide water;
wherein the internal combustion engine is further configured to receive the exhaust from the gas/liquid separator.

12. The engine system of claim 11, wherein the internal combustion engine is further configured to combust hydrogen.

13. The engine system of claim 12, wherein the internal combustion engine is further configured to receive an inert gas.

14. The engine system of claim 13, wherein the internal combustion engine is configured to receive other than nitrogen as the inert gas.

15. The engine system of claim 11, wherein the gas/liquid separator is configured such that the water is provided to atmosphere.

16. The engine system of claim 15, wherein:
the oxygen absorber is further configured to provide warm oxygen depleted air; and
the warm oxygen depleted air is expelled to atmosphere.

* * * * *